United States Patent [19]

Terada et al.

[11] Patent Number: 4,957,358
[45] Date of Patent: Sep. 18, 1990

[54] ANTIFOGGING FILM AND OPTICAL ELEMENT USING THE SAME

[75] Inventors: Junji Terada, Tokyo; Takeshi Sekiguchi, Yokohama, both of Japan

[73] Assignee: Canon Kabushiki Kaishi, Tokyo, Japan

[21] Appl. No.: 297,349

[22] Filed: Jan. 17, 1989

[30] Foreign Application Priority Data

Jan. 19, 1988 [JP] Japan .................................. 63-008665
Jan. 26, 1988 [JP] Japan .................................. 63-016201
Jan. 26, 1988 [JP] Japan .................................. 63-016203

[51] Int. Cl.⁵ .............................................. G02B 1/10
[52] U.S. Cl. ................................ 350/588; 350/582; 350/164
[58] Field of Search ............... 350/588, 1.7, 582, 164; 219/219

[56] References Cited

U.S. PATENT DOCUMENTS

| | | | |
|---|---|---|---|
| 1,791,254 | 2/1931 | Von Brockdorff | 350/588 |
| 2,442,913 | 6/1948 | Abrams et al. | 350/588 |
| 3,495,259 | 5/1968 | Martin et al. | 350/588 |
| 3,553,432 | 1/1971 | Livingston et al. | 350/588 |
| 3,624,347 | 11/1971 | Todd et al. | 219/219 |
| 4,251,316 | 2/1981 | Smallbone | 219/219 |
| 4,355,861 | 10/1982 | Sebald | 350/588 |
| 4,782,492 | 11/1988 | McMahon et al. | 350/96.29 |

Primary Examiner—Bruce Y. Arnold
Assistant Examiner—Terry S. Callaghan
Attorney, Agent, or Firm—Fitzpatrick, Cella, Harper & Scinto

[57] ABSTRACT

In an optical reflection preventing film comprised of a plurality of layers provided on an optical element, one of the plurality of layers is formed by a transparent electrically conductive layer, and the optical film thickness of the transparent electrically conductive layer is 45–120 nm.

6 Claims, 6 Drawing Sheets

ANTIFOGGING FILM AND OPTICAL ELEMENT USING THE SAME

BACKGROUND OF THE INVENTION

1. Field of the Invention

This invention relates to a transparent electrically conductive film whose transmittance is increased, and to an optical element in which said transparent electrically conductive film is caused to generate heat and thereby eliminate fogging occurring on the optical element.

2. Related Background Art

Cameras such as television cameras, video cameras and photographic cameras are sometimes used in an environment in which temperature and humidity change suddenly.

For example, there is a case where photographing is carried out outdoors in the rainy season in which the rain on the previous day ceases and temperature rises due to the fine weather from the morning. Generally, if the temperature of the open air changes suddenly, the difference between the temperature in the camera and the temperature of the open air becomes great and fogging sometimes occurs on the lens surface of the phototaking lens to make photographing impossible.

Therefore, for example, in the case of a television camera or the like, heating means has heretofore been provided in the camera so that when the environmental conditions of the open air change suddenly, the temperature in the camera is increased by the heating means to thereby prevent fogging from occurring on the lens surface.

However, it is very difficult to uniformly increase the temperature of each lens surface in the lens barrel and thereby prevent fogging from occurring on the entire lens surface, and it has often been the case that fogging inevitably occurs partly.

Also, even in the case of an optical apparatus used indoors, fogging may sometimes occur on the imaging lens thereof to reduce the performance thereof. In Japanese Utility Model Publication No. 62-41383, it is proposed to provide an electrically conductive film on the objective lens of a pick-up device for digital disk, supply an electric current to this electrically conductive film through an electrode and thereby warm the objective lens. This is considered to be an application of the technique of preventing condensation from occurring on the window glass of an automobile.

On the other hand, it has become popular to use a transparent electrically conductive film of indium oxide ($In_2O_3$) or tin oxide ($SnO_2$) as the transparent electrode of a liquid crystal panel.

This transparent electrically conductive film, if it is a single piece, is not high enough in transmittance.

As a method of decreasing the reflectance of a panel formed with a transparent electrically conductive film, there is known a film construction using a transparent electrically conductive film instead of a high refractive index layer, as a constituent film of a multilayer reflection preventing film formed on the surface of a substrate.

For example, with $\lambda_0$ as the central wavelength of the reflection preventing area, there is made a film construction comprising an integer layer (a layer having an optical film thickness integer times as great as $\frac{1}{4}$ of $\lambda_0$).

(1) Substrate glass - $In_2O_3$ ($\lambda_0/2$)–$MgF_2$ ($\lambda_0/4$)

(2) Substrate glass - $Al_2O_3$ ($\lambda_0/4$)–$In_2O_3$ ($\lambda_0/2$)–$MgF_2$ ($\lambda_0/4$)

where parentheses represent the optical film thickness obtained by multiplying the physical film thickness by the refractive index.

However, with these constructions, the reflectance of the transparent electrically conductive film could be decreased, but the light absorption of the film itself could not be decreased. In the material forming the transparent electrically conductive film, electrons are ready to be excited from the value electron zone to the electrically conductive zone. Light energy is absorbed during this excitation and therefore, the transparent electrically conductive film is readier to absorb light than an ordinary optical film such as $MgF_2$, $ZrO_2$ or $Al_2O_3$. In the reflection preventing film, this transparent electrically conductive film must be provided to a thickness corresponding to $\lambda_0/2$ for the central wavelength $\lambda_0$. Where $\lambda_0=500$, a film of a refractive index 1.9 need be as thick as 132 nm, and the decrease in transmittance by light absorption is great to a degree which cannot be neglected, and the use of such film, for example, as an antifogging film in an optical element whose transmittance is necessary up to approximately 100% leads to a great loss.

$SnO_2$ film (resistivity $2\times10^{-3}\Omega\cdot cm$) which is a transparent electrically conductive film being presently used has a transmittance of only 85% for a film thickness of 125 nm, and likewise, $In_2O_3$ film (resistivity $2\times10^{-4}\Omega/cm$) used as a transparent electrically conductive film provided a transmittance of only 90% for a film thickness of 125 nm.

SUMMARY OF THE INVENTION

It is an object of the present invention to increase the light transmittance of a multilayer film having a transparent electrically conductive layer.

It is another object of the present invention to provide a device in which a transparent electrically conductive film provided on the optical element of an optical system is caused to generate heat and thereby prevent fogging from occurring.

DESCRIPTION OF THE PREFERRED EMBODIMENTS

Figure 1:
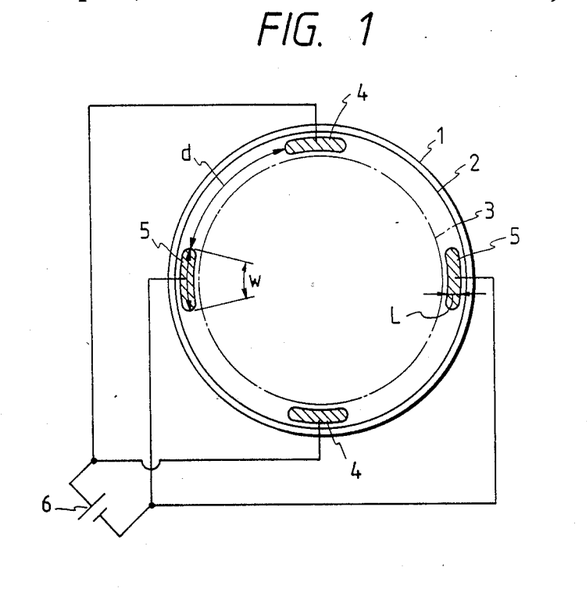
FIG. 1 is a front view of a lens provided with antifogging means.
Figure 2:
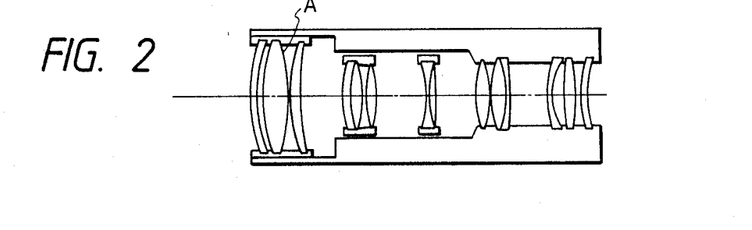
FIG. 2 is a cross-sectional view of a photo-taking lens.

Some specific embodiments of the present invention will hereinafter be described with reference to the drawings. FIG. 1 shows one A of phototaking lenses for a television camera shown in FIG. 2. It is desired to provide an antifogging film on all lenses constituting the photo-taking lens, but when it is taken into consideration that it is difficult to provide wiring for supplying electric power to the antifogging film in a narrow gap in the lens barrel, the purpose will be sufficiently achieved if the antifogging film is provided on second and third lens surfaces on which condensation is most liable to occur.

In FIG. 1, the reference numeral 1 designates an optical member whose outer peripheral portion comprises a circular lens of radius R. The reference numeral 2 denotes the transparent electrically conductive layer of a multilayer reflection preventing film. The transparent electrically conductive layer 2 is formed of indium oxide, tin oxide or the like as will be described in detail later, and is uniformly formed on the surface of the optical member 1. The reference numeral 3 indicates the effective diameter of the optical member 1. The reference numerals 4 and 5 designate electrodes each comprising an aluminum electrode terminal or the like for supplying electric power to the transparent electrically conductive layer 2. The electrodes 4 and 5 and the transparent electrically conductive layer 2 together constitute a part of heat generating means. The electrodes 4 and 5 are of an arcuate shape having a predetermined dimension, and even number of such electrodes are disposed on the outer marginal portion of the effective circle 3 on the surface of the transparent electrically conductive layer 2. Of these electrodes, the electrodes 4 are, for example, positive electrodes, and the electrodes 5 are negative electrodes. The reference numeral 6 denotes a DC stabilizing power source connected to the positive electrodes 4 and the negative electrodes 5. $\omega$ is the circumferential length of each arcuate electrode 4 (5), and is a dimension which satisfies $$\frac{1}{10} R \leq \omega \leq \tfrac{1}{2} \pi R \quad (1)$$

where R is the radius of the outer peripheral portion, and which further satisfies $$\omega \leq d \leq 13\omega \quad (2)$$

where d is the spacing between the adjacent electrodes.

In the present embodiment, electric power is supplied to the transparent electrically conductive layer 2 by the use of the electrodes 4 and 5 having the above-described dimension, whereby heat is uniformly generated on the surface in the effective circle 3 of the optical member 1. Thereby, fogging is effectively prevented from occurring on the surface of the optical member 1 when the outside environment changes suddenly. If the aforementioned conditions (1) and (2) are departed from, uniform heat generation will be come difficult.

In the present embodiment, the width L of the electrodes 4 and 5 may be arbitrary if it is in the outer marginal portion of the effective circle 3, and may preferably be $$\frac{R}{60} \leq L \leq \frac{R}{10}$$

when for example, the radius of the outer peripheral portion is R.

The present invention will now be described by the use of specific examples of numerical values. As a first example, the diameter of the optical member 1 is 120 mm, the diameter of the transparent electrically conductive layer 2 is 106 mm, the effective diameter 3 is 100 mm, and electrodes having an arcuate length $\omega$ of 23 mm are provided equidistantly at four locations in the outer marginal portion of the effective diameter 3 so that the spacing d between the adjacent electrodes is 55 mm.

When a voltage 10 V was applied from the DC stabilizing power source 6 to between the electrodes 4 and 5, the interior of the effective circle 3 of the film surface of the transparent electrically conductive layer 2 was heated to 30°–54° C. in about ten minutes thereafter, and no fogging occurred on the surface in the effective circle 3 of the optical member 1 even if humidity was rapidly over-saturated at an environmental temperature of 20° C. In the present example, a good antifogging effect is obtained at a low power consumption of only 5 W.

As a second example, an optical member having dimension similar to that in the first example was used, a pair of electrodes having a length $\omega$ of 80 mm were provided in opposed relationship with each other, a voltage 12 V was applied from the DC stabilizing power source 6 to between the two electrodes, and an electric current of 0.5 A was supplied. In about 20 minutes after the supply of the electric power, the surface in the effective circle 3 of the transparent electrically conductive layer 2 was uniformly heated in the range of 32°–46° C., and no fogging occurred on the surface in the effective circle 3 of the optical member 1 even if humidity was rapidly over-saturated at an environmental temperature of 20° C. In the present example, a good antifogging effect is obtained at a low power consumption of 6 W.

The multilayer reflection preventing film will now be described.

The reflection preventing film according to a specific example is constructed so that the film thickness of the transparent electrically conductive layer thereof is 120 nm or less and therefore, it is possible to reduce the light absorption of the transparent electrically conductive layer and obtain a sufficient transmittance for use in an optical element. Also, by adopting a film thickness in the range of 45–120 nm, the surface resistance becomes greater than in the prior art, and a sheet resistance appropriate for heat generation in an optical element such as an optical lens is obtained and thus, a reflection preventing film including a transparent electrically conductive layer which is good for use as an antifogging film becomes possible.

Herein, optical film thicknesses $\lambda/4$ and $\lambda/2$ are general terms, and strictly, the film thickness deviates more or less from these values in conformity with the characteristic necessary for the optical element used. Specifically, the ranges of the film thicknesses are as follows:

Film thickness $\lambda/4$: more than $0.18\lambda$ and less than $0.27\lambda$

Film thickness $\lambda/2$: more than $0.39\lambda$ and less than $0.6\lambda$

Figure 3:
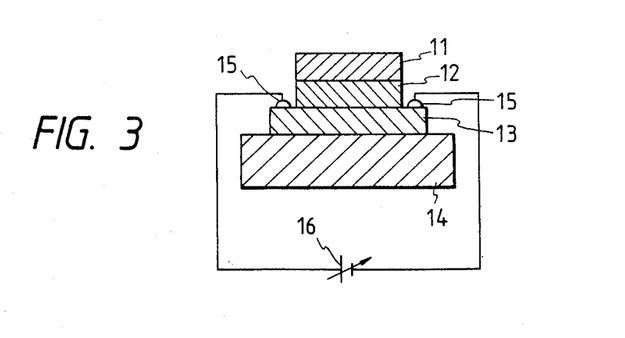
FIG. 3 is a schematic view representing the film construction of a reflection preventing film according to a third example of the present invention.

Referring to FIG. 3 which schematically shows the construction of the reflection preventing film, the reference numeral 11 designates a layer of $MgF_2$ having a low refractive index whose optical film thickness is $\lambda_0/4$ for the central wavelength $\lambda_0$ of the reflection preventing region, and having a refractive index of 1.38. The reference numerals 12 and 13 denote high refractive index layers, i.e., equivalent films, the sum of whose optical film thicknesses is equivalent to $\lambda_0/2$ for the central wavelength $\lambda_0$ of the reflection preventing region, and the layer 12 is a film of $ZrO_2$ having a higher refractive index than the transparent electrically conductive layer 13 and having a refractive index of 2.12, and the layer 13 is a transparent electrically conductive layer of indium oxide containing tin oxide having a refractive index of 1.9 (hereinafter named generically as the ITO layer), and the details thereof will be described later. The reference numeral 14 designates an optical lens of diameter 100 mm which is a substrate, the reference numeral 15 denote electrodes for supplying electric power to the transparent electrically conductive layer, and the reference numeral 16 designates a power source for supplying electric power to the transparent electrically conductive layer 13 to heat the surface of the optical lens and prevent condensation.

When an electric current is supplied from the power source 16 through the electrodes 15 to the ITO layer 13 of the reflection preventing film provided on the optical lens 14, the ITO layer 13 generates heat and the heat is transferred to the $MgF_2$ layer 11 which is the outermost layer of the reflection preventing film, whereby condensation on the surface of the $MgF_2$ layer 11 is prevented.

Figure 9:
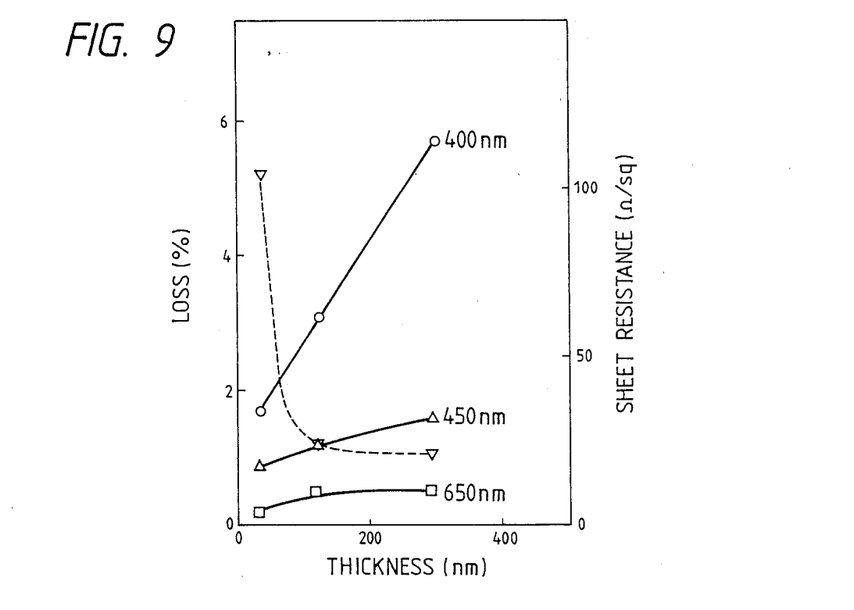
FIG. 9 shows the transmission loss rate characteristic by a variation in the film thickness of an ITO layer.

The transmission loss rates and sheet resistances of the ITO layer whose mixture weight ratio of $SnO_2$ is 5% and which was made with the film thickness thereof varied for lights of wavelengths 400 nm, 450 nm and 650 nm are shown in FIG. 9 (the broken line indicates the sheet resistance value).

From this figure, it is seen that the transmission loss rate is of a low value in the visible light range if the film thickness is 120 nm or less. Also, the sheet resistance value rises sharply if the film thickness is 45 nm or less, and sufficient heat generation is not obtained unless the voltage is increased. Accordingly, the film thickness of the ITO layer should effectively be set to the range of 45-120 nm.

Figure 4:
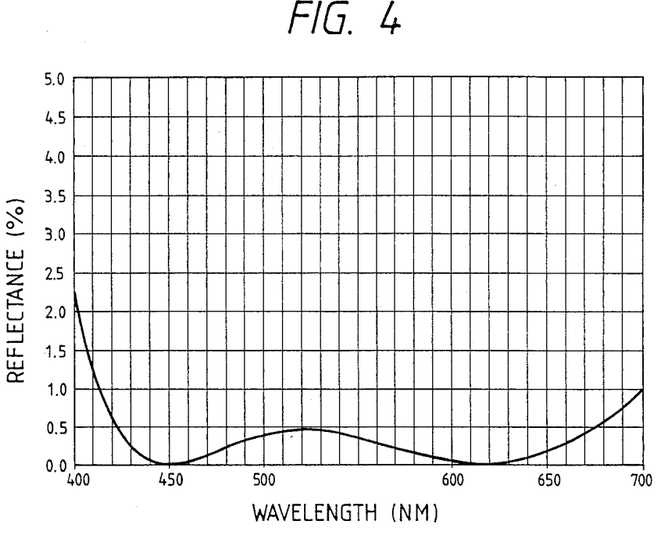
FIG. 4 shows the reflection preventing characteristic in the film construction according to the third example.
Figure 8:
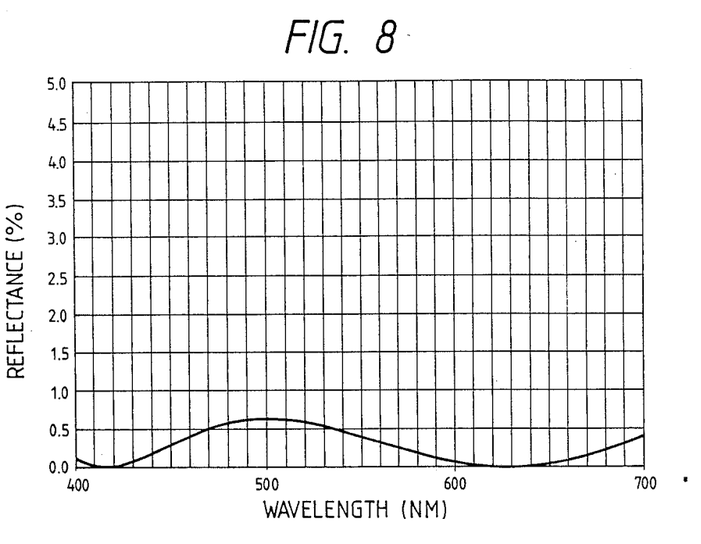
FIG. 8 shows the reflection preventing characteristic of a reflection preventing film according to the prior art.

For example, the reflection preventing characteristic when the optical film thicknesses of the respective layers are 190 nm, 55 nm and 138 nm from the optical lens side for the central wavelength length $\lambda = 552$ nm as the film construction of the reflection preventing film of FIG. 3 and an optical lens of refractive index 1.52 is used as the substrate 14 is shown in FIG. 4. The then actual film thickness of the ITO layer is 100 nm. For comparison, the reflection preventing characteristic of a reflection preventing film in which the $\lambda_0/2$ layer, the ITO layer 13 and the $ZrO_2$ layer 12 of FIG. 3 are replaced with an ITO layer of optical film thickness $\lambda_0/2$ is shown in FIG. 8. Comparing the two, it is seen that a sufficient reflection preventing characteristic is obtained by the construction of the present example in the range of 450-650 nm which is important in the optical lens. Also, in the film for comparison, the film thickness of the ITO layer is as great as 132 nm. In the present example, it is 100 nm. Since the light absorption amount of the ITO layer increases in conformity with the film thickness thereof, the present example is smaller in light absorption and a high transmittance is obtained.

The film surface when an electric current of 0.5 A was actually supplied to an ITO layer of sheet resistance 20 $\Omega$/sq was heated to 40° C. in about 10 minutes after the supply of the electric power, and no fogging was observed on the optical lens in a condition in which the environmental temperature was 25° C. and humidity was over-saturated, and the antifogging effect could be confirmed. It should be noted that a satisfactory reflection preventing function required of the optical lens was maintained.

Figure 5:
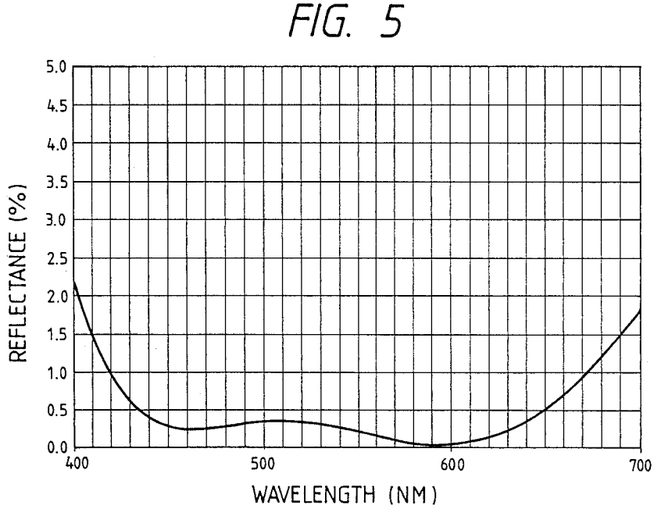
FIG. 5 shows the reflection preventing characteristic in a film construction according to a fourth example.

Shown in FIG. 5 is the reflection preventing characteristic of a film construction in which, as a modification of the film construction of the reflection preventing film of FIG. 3, an ITO layer having an optical film thickness of 90 nm as a transparent electrically conductive layer and a $ZrO_2$ layer of a higher refractive index 2.1 having an optical film thickness of 194 nm, for a light of the central wavelength $\lambda_0 = 476$ nm, are formed on an optical lens 14 having a refractive index of 1.52 and a diameter of 50 mm and a $\lambda_0/2$ layer is formed by these two layers and an $MgF_2$ layer of a low refractive index 1.38 having an optical film thickness of 119 nm which is the final layer is formed as a $\lambda/4$ layer. In this example, the thickness of the ITO layer is as small as 47 nm while the reflection preventing characteristic remains good. From the comparison of FIG. 5 with FIG. 4, it is seen that the reflection preventing characteristic is varied. The layer thickness of the ITO layer may be thus varied between 45 to 120 mm, whereby fine correction of the characteristic is possible without changing the basic construction, that is, without greatly varying the reflection preventing characteristic.

When an electric current of 0.3 A was actually supplied from the stabilizing power source to the ITO layer, the surface of the layer was heated to 40° C. in about 10 minutes after the supply of the electric current, and no fogging occurred on the optical lens even if humidity became over-saturated in a temperature atmosphere of 25° C., and a satisfactory reflection preventing function was maintained.

Figure 6:
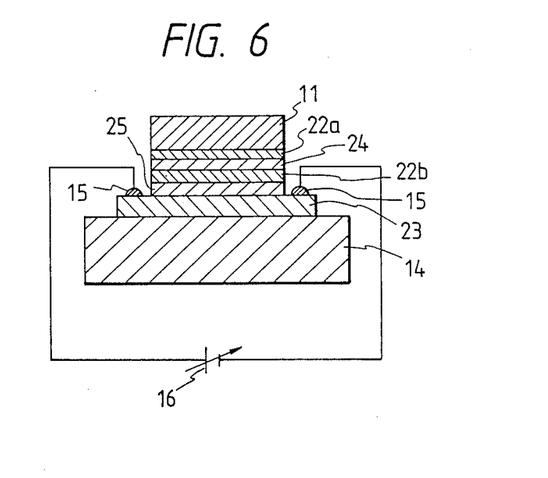
FIG. 6 is a schematic view representing the film construction of a reflection preventing film according to a fifth example.

As a fifth example, the construction of a reflection preventing film in which, for the design wavelength $\lambda_0$, the basic construction comprising integer layers is formed by three layers from a substrate, i.e., a layer of film thickness $\lambda_0/4$ having a refractive index higher than that of the substrate, a layer of film thickness $\lambda_0/2$ having a higher refractive index and a layer of film thickness $\lambda_0/4$ having a refractive index lower than that of the substrate and the first layer is replaced with a transparent electrically conductive film 23 comprising non-integer layers and a non-integer layer 25 having a lower refractive index and the second layer is replaced with a film comprising three non-integer layers including a non-integer layer 24 of a refractive index lower than that of two non-integer layers 22a and 22b of a high refractive index therebetween is schematically shown in FIG. 6.

Figure 7:
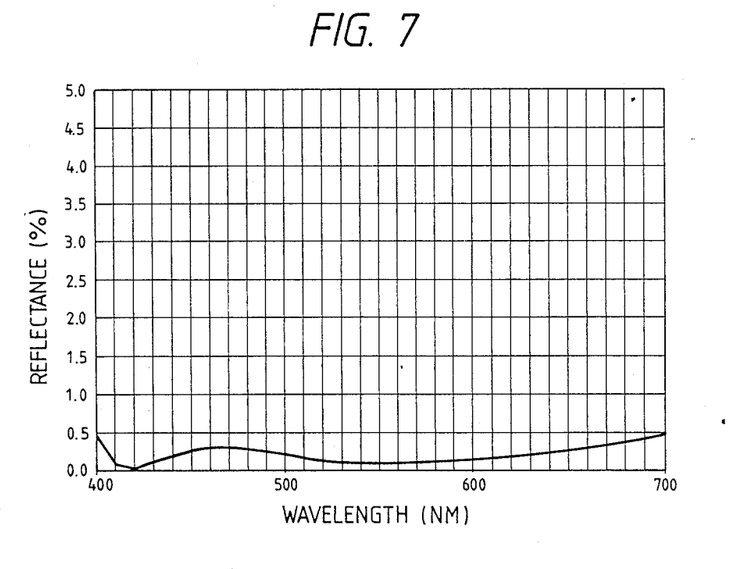
FIG. 7 shows the reflection preventing characteristic in the film construction according to the fifth example.

Specifically, for a light of the central wavelength $\lambda_0 = 540$ nm, the refractive index of the substrate was 1.70, and the refractive indices of the respective layers from the substrate side were: 1.9 for the ITO transparent electrically conductive layer, 1.6 for $Al_2O_3$, 2.1 for $ZrO_2$, 1.6 for $Al_2O_3$, 2.1 for $ZrO_2$, and 1.38 for $MgF_2$; the optical film thicknesses of the respective layers were 90 nm, 20 nm, 159 nm, 23 nm, 66 nm and 135 nm; and the diameter of the substrate was 60 mm. The reflection preventing characteristic of this film is shown in FIG. 7.

The ITO layer comprising non-integer layers is combined with a non-integer layer having the same medium refractive index to make them equivalent to an integer layer having a medium refractive index lower than the high refractive index layer, thereby obtaining a good reflection preventing characteristic without changing the optical film thickness.

When an electric current of 0.35 A was supplied from the stabilizing power source to the ITO layer, the surface of the layer was heated to 40° C. in about 10 minutes after the supply of the electric current, and no fogging occurred on the optical lens even if humidity became over-saturated in a temperature atmosphere of 25° C., and an efficient antifogging function was exhibited at a power consumption of 8 W and a sufficient reflection preventing function was maintained.

Description will hereinafter be made of the action of an ITO layer consisting of $In_2O_3$ of a refractive index of 1.9 mixed with $SnO_2$ of a total weight ratio 2.5–6%.

Figure 10:
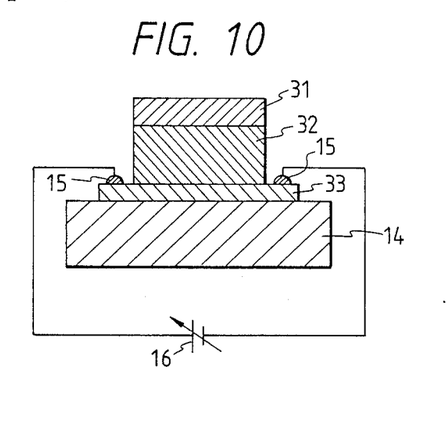
FIG. 10 shows the film construction of a reflection preventing film according to a sixth example.

Referring to FIG. 10 which is a schematic construction view, the reference numeral 31 designates an $MgF_2$ layer of a refractive index of 1.38, the reference numeral 32 denotes a $ZrO_2$ layer of a refractive index of 2.1, the reference numeral 33 designates an ITO layer, and the reference numeral 34 denotes an optical lens formed of a material of a refractive index of 1.52 which is a substrate, i.e., an optical element, having this multilayer film attached to the surface thereof. The refractive indices of the layer 31, 32 and 33 relative to the substrate are low, high and medium (lower than the layer 32 and higher than the substrate) in the named order. Also, the optical film thicknesses (the actual film thickness x refractive index) of the respective layers for the approximate central wavelength and reference wavelength λ of the light which is the object of this optical element are λ/4 for the $MgF_2$ layer 31 and λ/2 for the $ZrO_2$ layer 32 and the ITO layer 33 as combined together. A reflection preventing film is formed by this multilayer construction. The reference numeral 15 designates electrodes for supplying electric power to the ITO layer 33, and the reference numeral 16 denotes a variable power source for applying a voltage to the ITO layer 33 through the electrodes 15 to thereby cause the ITO layer 33 to generate heat. The surface portion of the optical lens 14, i.e., the $MgF_2$ layer 31, is heated by the proper supply of electric power from the variable power source 16, whereby condensation is prevented.

Figure 11:
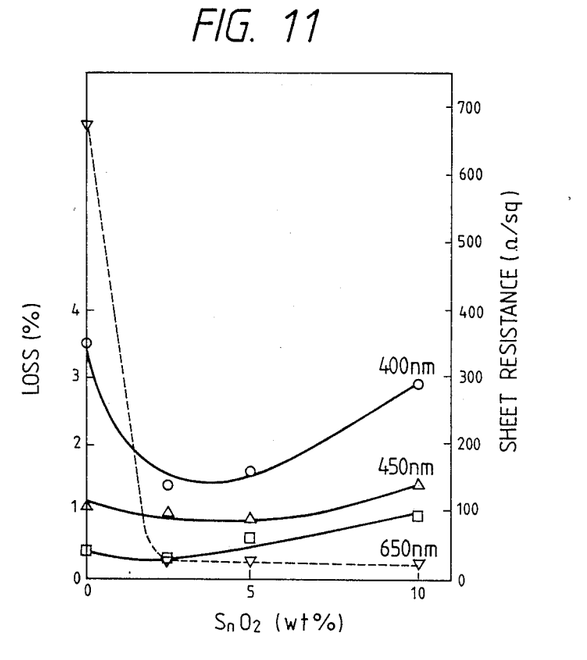
FIG. 11 shows the relation between the weight ratio of SnO$_2$ of an ITO layer in a film thickness of 80 nm and the transmission loss rate and sheet resistance at each wavelength.

Here, the mixture weight ratio of $SnO_2$ which is an evaporating material was varied in the range of 0–10% and the transmission loss rates and sheet resistances of an ITO layer of film thickness 80 nm obtained by the vacuum evaporation method in lights of wavelengths 400 nm, 450 nm and 650 nm were measured. The transmission loss rates and sheet resistance characteristic by the mixture weight ratio obtained thereby are shown in FIG. 11 (the broken line indicates the sheet resistance value). It is seen from this figure that when the weight ratio of $SnO_2$ is 2.5–6%, particularly 3–5%, the transmission loss amount (the light absorption amount) becomes smallest. This is considered to be because by adding a small amount (2.5–6%) of $SnO_2$ to $In_2O_3$, the exciting energy from the value electron zone to the conductive zone moves to the high energy side and therefore the absorbing area which was the short wavelength side of the visible range moves to the ultraviolet side. Accordingly, if a mixture layer consisting of $In_2O_3$ with $SnO_2$ of a weight ratio 2.5–6%, particularly 3–5%, added thereto is a constituent layer of the reflection preventing film, there can be realized a reflection preventing film which is small in the absorption by the transparent electrically conductive layer. In this range, the sheet resistance value also is a low value, and sufficient heat generation is obtained even at a low voltage value.

Further, the transmission loss rates and sheet resistances of an ITO layer made at a mixture weight ratio 5% of $SnO_2$ with the layer thickness varied, for lights of wavelengths 400 nm, 450 nm and 650 nm, are shown in FIG. 9 (the broken line indicates the sheet resistance value).

It is seen from this figure that if the layer thickness is about 200 nm or less, the transmission loss rate is generally of a low value in the visible light range. Also, for a layer thickness of about 40 nm or less, the sheet resistance value rises sharply and sufficient heat generation is not obtained unless the voltage is increased. Accordingly, the film thickness of the ITO layer should effectively be set to the range of 40 nm–200 nm, particularly the range of about 45 nm–120 nm.

The details of a multilayer film of the reflection preventing film construction of FIG. 10 will now be described as a specific example. A film of the aforedescribed construction is formed on the surface of an optical lens having a diameter of 100 mm. The ITO layer is deposited by vacuum evaporation by evacuating the interior of the bell jar of an evaporating apparatus to a degree of vacuum of $1 \times 10^{-5}$ Torr or less, and thereafter introducing oxygen gas thereinto and regulating the interior thereof to a degree of vacuum of $4.0 \times 10^{-4}$ Torr, and heating a mixture evaporating material of $In_2O_3$ and $SnO_2$ (the total weight ratio of $SnO_2$ is 5%) by an electron beam, and fluctuating the evaporation speed on a glass substrate heated to a temperature of 300° C. in the range of 1–3Å/sec. in accordance with the progress of film formation. The film thicknesses of the respective layers are: 100 nm for the $MgF_2$ layer, 26 nm for the $ZrO_2$ layer, and 100 nm for the ITO layer. If the reference wavelength λ=550 nm, the film thickness of the $MgF_2$ layer corresponds to λ/4, and the film thickness of the $ZrO_2$ layer and the film thickness of the ITO layer compositely correspond to λ/2. The result obtained by applying a visible light and measuring the reflection preventing characteristic is as shown in FIG. 4. A reflection preventing film having a sufficient reflection preventing characteristic can be made by thus using an ITO layer of the aforedescribed construction. From this, it is seen that a reflection preventing film small in both reflection and absorption, that is, very high in transmittance, has become by the construction of the present invention. In fact, when an electric current of 0.5 A was supplied to the ITO layer in this film at a DC voltage of 12 V, the surface of the layer was heated to 40° C. in about 10 minutes after the supply of the electric current, and no fogging was seen on the optical glass even if the humidity was rapidly over-saturated at an environmental temperature of 25° C., and it could be confirmed that the resultant film was a reflection preventing film having an antifogging action at a low power consumption of only 6 W. Thus, it is seen that the characteristic as an antifogging film also is good.

Figure 12:
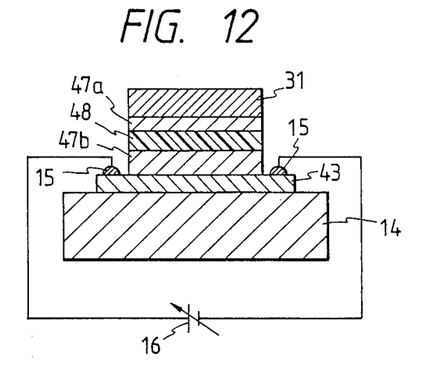
FIG. 12 shows the film construction of a reflection preventing film according to a seventh example.

The reflection preventing film according to another example of the present invention in which for the reference wavelength λ, a film thickness corresponding to ($\frac{1}{4}$-$\frac{1}{2}$-174 )λ is the basic film construction is shown in FIG. 12.

Figure 13:
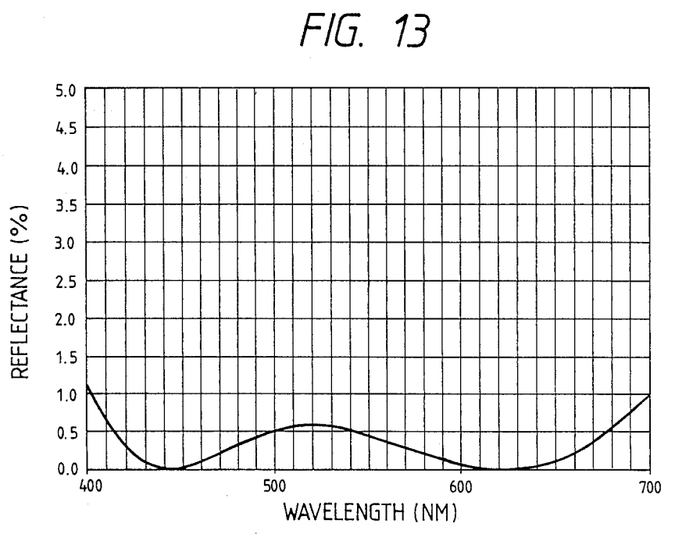
FIG. 13 shows the reflection preventing characteristic in the film construction according to the seventh example.

In FIG. 12, members similar to those in FIG. 10 are given similar reference numerals. The reference characters 47a and 47b designate $ZrO_2$ layers of a refractive index of 2.1, and the reference numeral 48 denotes an $Al_2O_3$ layer of a refractive index of 1.63. A λ/2 layer is formed by the layers 47a, 48 and 47b. The present example will be described in detail as a specific example. The film of FIG. 12 is made by a method similar to the method of the example of FIG. 10. On an optical lens formed of a material of a refractive index of 1.5 for a light of a reference wavelength λ=480 nm, an ITO layer having a refractive index of 1.9 and a film thickness 54 nm and a weight ratio 5% of $SnO_2$ was constructed as a layer having a film thickness corresponding to $\frac{1}{4}$ λ, a $ZrO_2$ layer having a refractive index of 2.1 and a film thickness of 61 nm, an $Al_2O_3$ layer having a refractive index of 1.63 and a film thickness of 12 nm and a $ZrO_2$ layer having a refractive index of 2.1 and a film thickness of 17 nm were constructed as a layer having a film thickness corresponding to $\frac{1}{2}$ λ, and an $MgF_2$ layer having a refractive index of 1.38 and a film thickness of 86 nm was constructed as a layer having a film thickness corresponding to $\frac{1}{4}$ λ. The reflection preventing characteristic of this reflection preventing film is shown in FIG. 13. Thus, in such other multilayer film construction as well, the reflection preventing characteristic can be made good and a high transmittance can be realized together with a low absorbing property.

When the film construction of such reflection preventing characteristic was adopted for optical glass of 16 mm square and an electric current of 0.1 A was supplied to the ITO layer at a voltage of 6 V, the surface of the layer was heated to 40° C. in about 10 minutes after the supply of the electric current, and no fogging was seen on the optical glass even if the humidity was rapidly over-saturated at an environmental temperature of 25° C., and it could be confirmed that this film was a reflection preventing film having an antifogging action at a low power consumption of only 0.6 W. The characteristic as an antifogging film also is good.

What is claimed is:

1. A photographing optical device having the fogging of the lens surface thereof prevented, said photographing optical device being provided with:
    a transparent electrically conductive film provided on the circular area of the lens;
    a plurality of curved belt-like electrodes provided along the edge of the circular area and differing in polarity from the adjacent electrode;
    the following conditions being satisfied:

$$1/10 \cdot R[\leqq] \leqq \omega[\leqq] \leqq \tfrac{1}{2} \cdot \pi[\pi]R$$

$$\omega[\leqq] \leqq d[\leqq] \leqq 13\,\omega$$

where R is the radius of the circular area, ω is the length of the electrodes, and d is the spacing between the electrodes; and
    a power source circuit for supplying an electric current to said electrodes, wherein a dielectric substance lever constituting a reflection preventing film with said transparent electrically conductive film is provided on said transparent electrically conductive film, and the film thickness of said transparent electrically conductive film is between 45–120 nm.

2. An optical device according to claim 1, wherein the following condition is satisfied:

$$R/60 \leqq L \leqq R/10$$

where L is the width of said electrodes.

3. An optical device according to claim 1, wherein a dielectric substance layer constituting a reflection preventing film with said transparent electrically conductive film is provided on said transparent electrically conductive film, said transparent electrically conductive film is a mixture film of $In_2O_3$ and $SnO_2$, and the weight ratio of $SnO_2$ in said mixture film is 2.5 –6%.

4. A photographing device for preventing a photographing lens having a plurality of lenses with optical power from fogging, comprising:
    a transparent electrically conductive film provided on a circular area of a surface of one of said lenses;
    at least a pair of electrodes provided along the edge of said circular area, wherein the following condition is satisfied:

$$1/10 \cdot R \leqq \omega \leqq \tfrac{1}{2}\pi \cdot R$$

$$\omega \leqq d \leqq 13\,\omega$$

where R is a radius of said circular area, ω is the arcuate length of each electrode, and d is a distance between the electrodes;
    a dielectric substance layer provided on said circular area for constituting a reflection preventing film; and
    means for supplying an electric current to said a pair of electrodes.

5. A photographing device according to claim 4, wherein the following condition is satisfied:

$$R/60 \leqq L \leqq R/10$$

6. A photographing device according to claim 4, wherein said transparent electrically conductive film has a film thickness of between 45 and 120 nm.

* * * * *

UNITED STATES PATENT AND TRADEMARK OFFICE
CERTIFICATE OF CORRECTION

PATENT NO. : 4,957,358
DATED : September 18, 1990
INVENTOR(S) : Junji Terada, et al It is certified that error appears in the above-identified patent and that said Letters Patent is hereby corrected as shown below:

COLUMN 4:

Line 2, "be come" should read --become--.

COLUMN 8:

Line 7, close up vertically.

COLUMN 10:

Line 3, "$1/10 \cdot R[\leq] \leq w[\leq] \leq \frac{1}{2} \cdot \pi[\pi]R$" should read
--$1/10 \cdot R \leq w \leq \frac{1}{2} \cdot \pi R$--;

Line 5, "$w[\leq] \leq d[\leq] \leq 13w$" should read
--$w \leq d \leq 13w$--; and Line 55, "$R/60 \leq L \leq R/10$" should read
--$R/60 \leq L \leq R/10$
where L is the width of said electrode.--

Signed and Sealed this

Thirtieth Day of June, 1992

*Attest:*

DOUGLAS B. COMER

*Attesting Officer*  *Acting Commissioner of Patents and Trademarks*